(12) United States Patent
Nystad et al.

(10) Patent No.: US 10,825,125 B2
(45) Date of Patent: Nov. 3, 2020

(54) PERFORMING CONVOLUTION OPERATIONS IN GRAPHICS TEXTURE MAPPING UNITS

(71) Applicant: Arm Limited, Cambridge (GB)

(72) Inventors: Jorn Nystad, Trondheim (NO);
Carmelo Giliberto, Trondheim (NO);
Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/139,408

(22) Filed: Sep. 24, 2018

(65) Prior Publication Data

US 2019/0096025 A1 Mar. 28, 2019

(30) Foreign Application Priority Data

Sep. 25, 2017 (GB) .................................. 1715476.6

(51) Int. Cl.
*G06T 11/00* (2006.01)
*G06T 15/00* (2011.01)
*G06T 1/20* (2006.01)
*G06T 1/60* (2006.01)
*G06T 15/04* (2011.01)

(52) U.S. Cl.
CPC .................. *G06T 1/20* (2013.01); *G06T 1/60* (2013.01); *G06T 11/001* (2013.01); *G06T 15/005* (2013.01); *G06T 15/04* (2013.01)

(58) Field of Classification Search
CPC . G06T 1/20; G06T 1/60; G06T 11/001; G06T 15/005; G06T 15/04
USPC ........................................................ 345/582
See application file for complete search history.

(56) References Cited

U.S. PATENT DOCUMENTS

| 7,593,018 B1 * | 9/2009 | Toksvig | ................ G06T 3/4007 345/582 |
| 2007/0008333 A1 * | 1/2007 | Xu | ......................... G06T 15/04 345/582 |
| 2011/0025700 A1 | 2/2011 | Lee | |
| 2018/0046900 A1 * | 2/2018 | Dally | ................... G06N 3/0427 |

FOREIGN PATENT DOCUMENTS

GB 2476141 6/2011

OTHER PUBLICATIONS

GB Combined Search and Examination Report dated Mar. 14, 2018, UK Patent Application No. GB1715476.6.

* cited by examiner

*Primary Examiner* — Jacinta M Crawford
(74) *Attorney, Agent, or Firm* — Vierra Magen Marcus LLP

(57) ABSTRACT

A texture mapping apparatus, e.g. of a graphics processing unit, comprises texture fetching circuitry operable to receive a set of weight values for a convolution operation and fetch from memory a set of input data values on which the convolution operation is to be performed. The texture mapping apparatus further comprises texture filtering circuitry operable to perform a convolution operation using the set of received weight values and the set of fetched input data values. The texture mapping apparatus can allow a graphics processing unit to perform a variety of convolution operations in an efficient manner.

16 Claims, 7 Drawing Sheets

PERFORMING CONVOLUTION OPERATIONS IN GRAPHICS TEXTURE MAPPING UNITS

The technology described herein relates to a method of and an apparatus for performing a convolution operation in a graphics texture mapping unit.

It is common in data processing units (e.g. processors) to perform convolution operations. Convolution operations can, for example, be used to perform image post-processing, such as blurring, sharpening, embossing, edge detection, image upscaling etc. Convolution operations can also be used when implementing artificial neural networks (convolutional neural networks), for example to perform image recognition and classification.

A convolution operation typically comprises applying a set or "kernel" of weight values to a corresponding set or "window" of data values for a particular convolution position of an array of input data values (such as an unprocessed image). The weighted set of data values are then typically summed to provide an output data value for the particular convolution position in question. This process is typically then repeated in respect of each convolution position of the overall array of input data values being convolved to produce an output array of data values (such as a processed image).

When performed in a graphics processing unit (e.g. graphics processor), a convolution operation can be performed by programmable processing circuitry (e.g. a programmable shader unit) of the graphics processing unit. In these arrangements, the programmable processing circuitry will typically execute a program that performs two load operations, one to load the kernel of weight values from memory, and another to load the (input) data values that the convolution operation is to be performed on from memory, and that then performs a series of arithmetic operations on the (input) data values using the kernel of weight values to calculate the required weighted sums.

A convolution operation can require large numbers of load and arithmetic operations to be performed. Although a graphics processing unit can be well suited to performing large numbers of operations (e.g. in parallel), a convolution operation can nevertheless still consume significant amounts of the graphics processing unit's processing resources. For example, the graphics processing unit may be required to perform "load" instructions (to load weight values and input data values), perform "arithmetic" instructions (to weight and sum the input data values), and perform "store" instructions (to store the results of the convolution operations) many times over.

The Applicants believe that there is scope for improvements to the performance of convolution operations in data processing systems, such as graphics processing systems.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
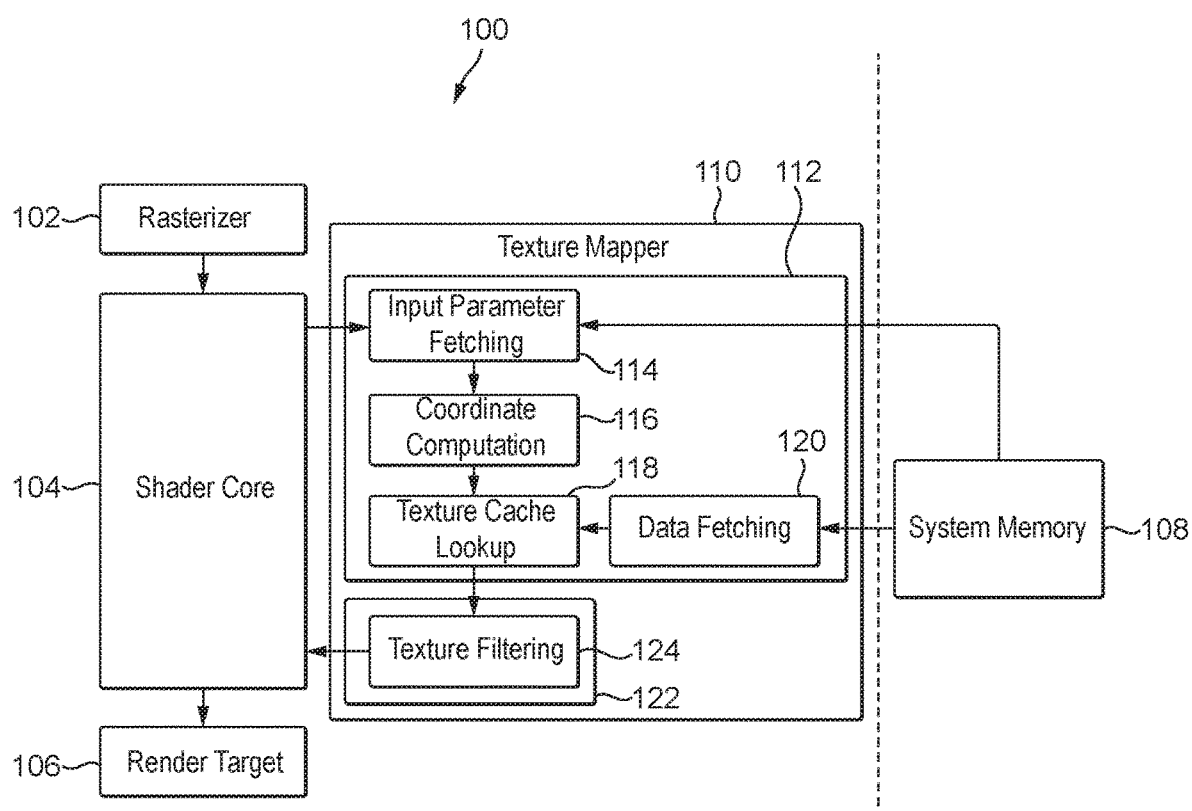
FIG. 1 shows schematically a graphics processing unit having a texture mapping apparatus according to an embodiment of the technology described herein.

An embodiment of the technology described herein comprises a method of operating a computer graphics texture mapping apparatus, the method comprising:

providing an instruction to perform a convolution operation to a graphics texture mapping apparatus, the instruction indicating a set of weight values to be used in the convolution operation and a set of input data values on which the convolution operation is to be performed;

the method further comprising:
the texture mapping apparatus in response to receiving the instruction to perform a convolution operation:
receiving the indicated set of weight values to be used in the convolution operation and fetching from memory the indicated set of input data values on which the convolution operation is to be performed; and
performing the convolution operation on the set of input data values indicated in the instruction using the set of weight values indicated in the instruction.

Another embodiment of the technology described herein comprises a graphics processing unit comprising:
a texture mapping apparatus; and
data processing circuitry operable to provide an instruction to perform a convolution operation to the texture mapping apparatus, the instruction indicating a set of weight values to be used in the convolution operation and a set of input data values on which the convolution operation is to be performed;
wherein the texture mapping apparatus comprises:
texture fetching circuitry operable to fetch from memory a set of input data values on which a convolution operation is to be performed; and
texture filtering circuitry operable to perform a convolution operation using a set of weight values indicated in a convolution operation instruction received by the texture mapping apparatus on a set of input data values fetched by the texture fetching circuitry.

The technology described herein also extends to the operation of the texture mapping apparatus and to the texture mapping apparatus per se.

Thus, another embodiment of the technology described herein comprises a method of operating a graphics texture mapping apparatus, the method comprising the texture mapping apparatus:

receiving a set of weight values for a convolution operation to be performed and fetching from memory a set of input data values on which the convolution operation is to be performed; and performing the convolution operation on the fetched set of input data values using the received set of weight values.

Another embodiment of the technology described herein comprises a graphics texture mapping apparatus, the texture mapping apparatus comprising:

texture fetching circuitry operable to receive a set of weight values for a convolution operation to be performed, and to fetch from memory a set of input data values on which a convolution operation is to be performed; and texture filtering circuitry operable to perform a convolution operation on a set of input data values fetched by the texture fetching circuitry using a set of weight values received by the texture fetching circuitry.

The Applicants have identified that there can be a great deal of similarity between (e.g. 2D) convolution operations, for example in which a set or "kernel" of weight values are applied to respective sets or "windows" of data values of an array of input data values, and graphics texture mapping operations, for example in which a set of texture data values (texels) is fetched from memory and subjected to texture filtering using interpolation weight values calculated internally by a texture mapping apparatus.

In view of this, the Applicants have further identified that a texture mapping apparatus can be re-purposed so as to perform convolution operations, e.g. in an efficient manner. In particular, the Applicants have identified that texture fetching circuitry of a texture mapping apparatus can be operated so as to receive (e.g. be provided with or fetch from memory) a set or kernel of weight values for the desired convolution operation (rather than, e.g., the texture mapping apparatus calculating a set of interpolation weight values internally as is usually the case in a texture mapping operation). The texture fetching circuitry of the texture mapping apparatus can also be operated so as to fetch a set or window of input data values on which the desired convolution operation is to be performed from memory (e.g. in a similar manner to fetching a set of texture data values (texels) for a texture mapping operation from memory).

Texture filtering circuitry of the texture mapping apparatus can then be operated so as to use the set or kernel of received weight values to perform the desired convolution operation on the set or window of fetched input data values (rather than, e.g., internally calculating and then using a set of interpolation weight values as is usually the case in a texture mapping operation). As will be discussed in more detail below, this then allows the convolution operation to be performed by the texture mapping apparatus, e.g. in an efficient manner, using less data transfer, and/or using fewer instructions. This can also then leave other processing resources (such as programmable processing circuitry (e.g. a shader)) of a graphics processing unit (graphics processor) available for performing other data (e.g. graphics) processing operations, thereby increasing the flexibility and capability of the graphics processing unit.

Furthermore, the texture mapping apparatus may still be operable to perform, and may perform, one or more texture mapping operations if required. Thus, in some embodiments, the texture mapping apparatus may also perform one or more (and typically plural) texture mapping operations. Thus, embodiments may further comprise the texture fetching circuitry fetching from memory a set of texture data values (texels) with which a texture mapping operation is to be performed. Embodiments may further comprise the texture filtering circuitry calculating (e.g. internally) a set of interpolation weight values for the texture mapping operation. Embodiments may further comprise the texture filtering circuitry performing the texture mapping operation using the set of calculated interpolation weight values and the set of fetched texture data values.

In embodiments, the texture fetching circuitry may be operable to receive, and may receive, an instruction to perform the texture mapping operation. The instruction for the texture mapping operation can take any desired and suitable form. For example, the instruction may indicate one or more arrays of texture data values or "surfaces" (e.g. textures or "mipmaps") with which the texture mapping operation should be performed. An array of texture data values can take any desired and suitable form. The instructions for the texture mapping operation may, for example, indicate (e.g. using a set of coordinates) a sampling position in respect of which the texture mapping operation should be performed.

Similarly, in embodiments, the texture fetching circuitry may be operable to receive, and may receive, an instruction to perform a convolution operation. The instruction for the convolution operation can again take any desired and suitable form. For example, the instruction for the convolution operation may indicate one or more arrays of input data values or "surfaces" (e.g. images, textures or other arrays of data) on which the convolution operation should be performed. An array of input data values can take any desired and suitable form, such as an array of image or graphics data (e.g. for image or graphics post-processing, image recognition, image classification, etc.) or an array of non-image or non-graphics data (e.g. for non-image or non-graphics data processing). The instruction may indicate (e.g. using indices) a convolution position within the array of input data values in respect of which the convolution operation should be performed. These embodiments can allow the texture mapping apparatus to be instructed to perform a convolution operation in a substantially similar manner to a texture mapping operation, and thus reduce or avoid the need for explicit instructions (e.g. there may be no need for explicit "load", "arithmetic" and "store" instructions) and/or extensive re-configuration (e.g. additional hardware elements) of the texture mapping apparatus in order to perform a convolution operation.

As discussed above, in embodiments, an instruction for a convolution operation may also indicate the set or kernel of weight values to be used in the convolution operation. In some embodiments, an instruction to perform the convolution operation may also indicate a larger array or "atlas" of plural sets or kernels of weight values that comprises the set or kernel of weight values to be used in the convolution operation. The instruction may, for example, indicate (e.g. using indices) the location of the set or kernel of weight values to be used in the convolution operation within the atlas.

The instruction may further indicate the size of the set or kernel of weight values to be used in the convolution operation. This may be done by indicating the size of the set or kernel of weight values to be used in the convolution operation in terms of the number and/or the configuration of elements (weights) in the kernel. For example, the instruction could indicate that a 3×3 (or 5×5, etc.) kernel is to be used. Other arrangements, such as indicating the kernel size in terms of bits or bytes would also be possible, if desired.

This then allows a single larger data structure (the kernel or weight "atlas") to be used in place of plural smaller data structures for sets or kernels of weight values for plural different convolution operations. This in turn can reduce the overhead (e.g. number of headers for data structures), and thus storage space, needed to store the sets or kernels of weight values for plural different convolution operations.

Thus, in embodiments, an instruction to perform a convolution operation and/or texture mapping operation may indicate one or more input parameters. The input parameters may be indicated using one or more descriptors. The one or more descriptors may be contained in the instruction and/or may be stored in memory. The memory used to store the one or more descriptors may be the same memory or may be a different memory to that which stores the weight values and/or input data values. The texture fetching circuitry may be operable to fetch, and may fetch, the descriptors and/or input parameters required to perform a convolution operation and/or texture mapping operation, e.g. from memory, in response to an instruction to perform a convolution operation and/or texture mapping operation.

The descriptors may take any desired and suitable form. In the case of a texture mapping operation, a descriptor may comprise a "texture descriptor" (TXD). The texture descriptor may indicate one or more "surface descriptors" (SFDs) for the texture mapping operation. A surface descriptor may indicate and/or describe an array of texture data values or surface with which the texture mapping operation should be performed. Similarly, in the case of a convolution operation, a descriptor may comprise a texture descriptor (TXD). The texture descriptor may indicate one or more surface descriptors (SFDs) for the convolution operation. A surface descriptor may again indicate and/or describe an array of input data values or surface on which the convolution operation should be performed.

In the case of a texture mapping operation, a descriptor may further comprise a sampler descriptor (SMD). The sampler descriptor may indicate a filtering method (e.g. bilinear, trilinear, etc.) and/or other parameters to be used for the texture mapping operation. In the case of a convolution operation, the sampler descriptor may instead indicate a (e.g. single) surface descriptor (SFD) for the convolution operation. In this case, the surface descriptor may, for example, indicate and/or describe the set or kernel of weight values, or an atlas that comprises the set or kernel of weight values, to be used for the convolution operation.

Again, these embodiments can allow the texture mapping apparatus to be directed to perform a convolution operation in a substantially similar manner to a texture mapping operation, and thus reduce or avoid the need for explicit instructions and/or extensive re-configuration (e.g. additional hardware elements) of the texture mapping apparatus in order to perform a convolution operation.

The set or kernel of weight values may be received by the texture mapping apparatus, etc., in any desired and suitable way.

For example, the texture mapping apparatus may be operable to receive, and may receive, the set or kernel of weight values for the convolution operation directly, e.g. from data processing circuitry, e.g. as part of and/or with an instruction to perform the convolution operation.

In an embodiment, the texture mapping apparatus is operable to receive, and receives, the set or kernel of weight values by fetching the set or kernel of weight values from storage, such as, and in an embodiment, from memory of the overall data processing system that the texture mapping apparatus is part of. In this case therefore, the texture mapping apparatus (e.g. texture fetching circuitry of the texture mapping apparatus) is operable to, and used to, fetch the set or kernel of weight values for the convolution operation from storage (memory). This may be the same memory or different memory (storage) to that which stores the set of input data values on which the convolution operation is to be performed.

In this case, the convolution operation instruction in an embodiment indicates the set or kernel of weight values to be fetched for the convolution operation, and the texture mapping apparatus (e.g. texture fetching circuitry of the texture mapping apparatus) is in an embodiment operable to fetch the indicated set or kernel of weight values from the storage (e.g. memory) in response to the instruction.

This has the advantage, e.g., that the technology described herein can accordingly be used to perform convolution operations with large numbers (e.g. several thousands) of weights that have been previously calculated (e.g. "offline"), such as might be the case, for example, for a neural network. Thus, the operation of the technology described herein can allow for a large number (e.g. thousands) of weights to be calculated "offline" and stored, and then used by the texture mapping apparatus flexibly in use to perform convolution operations.

Correspondingly, in an embodiment, the technology described herein comprises storing a plurality of weights (e.g. a weight or kernel atlas) e.g., and in an embodiment, in a compressed form, for use by the texture mapping apparatus to perform convolution operations.

Other arrangements would, of course, be possible.

In embodiments, the texture mapping apparatus may be operable to perform, and may perform, one or more (and typically plural) convolution operations, e.g. for a convolution of an overall input array of data values. A convolution may take any desired and suitable form that convolutions can take. For example, the convolution operation may be performed as part of an image post-processing operation, such as (Gaussian or Box) blurring, sharpening, embossing, edge detection, (high quality) image upscaling etc. The convolution operation may instead be performed as part of an artificial (e.g. convolutional) neural network processing operation, for example when performing image recognition and/or image classification. The convolution operation may instead be performed as part of a non-image data processing operation that comprises one or more convolution operations to be performed.

A texture mapping operation can also take any desired and suitable form that texture mapping operations can take. For example, a texture mapping operation may comprise bilinear interpolation, trilinear interpolation, or higher order ("N"-linear) interpolation or anisotropic filtering, etc.

A texture mapping operation can also be performed in any desired and suitable way. In embodiments, the texture filtering circuitry may be operable to perform, and may perform, a texture (e.g. bilinear, trilinear, etc.) mapping operation respectively for one or more sampling positions. As discussed above, a sampling position for a texture mapping operation may be indicated with the instruction to perform the texture mapping operation. A texture processing pass may be performed by the texture filtering circuitry as an application (multiplication) of a set of (e.g. internally) calculated interpolation weight values for a sampling position to a corresponding set of texture data values, and accumulation (e.g. summation) of the interpolated results. A texture mapping operation for a sampling position that is at or near the edge of an array of texture data values can be handled in any desired and suitable manner, e.g. by extending the edge of the array with the texture data values at that edge, by wrapping the array by taking texture data values from the opposite edge, by mirroring the texture data values at the edge, by cropping the resultant output array, etc.

A convolution operation can also be performed in any desired and suitable way, e.g. in a similar manner to a texture mapping operation. For example, in embodiments, the texture filtering circuitry may be operable to perform, and may perform, a convolution operation respectively for one or more (and typically plural) convolution positions within an array of input data values, e.g. for a convolution of an overall input array of data values. As discussed above, a convolution position may be indicated with the instruction to perform the convolution operation. A convolution operation may be performed as an application (multiplication) of a set or kernel of received weight values to a corresponding set or window of fetched input data values for the convolution position, and accumulation (e.g. summation) of the weighted results. Again, a convolution operation for a convolution position that is at or near the edge of an array of input data values can be handled in any desired and suitable manner, e.g. by extending the edge of the array with the input data values at that edge, by wrapping the array by taking input data values from the opposite edge, by mirroring the input data values at the edge, by cropping the resultant output array, etc. Again, these embodiments can allow the texture mapping apparatus to perform convolution operations in a substantially similar manner to texture mapping operations, and thus reduce or avoid the need for explicit instructions and/or extensive re-configuration of the texture mapping apparatus in order to perform a convolution operation.

A texture mapping operation may be performed as one or more texture processing passes (e.g. bilinear filtering passes). For example, a texture mapping operation that comprises bilinear interpolation may be performed as a single bilinear filtering pass, a texture mapping operation that comprises trilinear interpolation may be performed as two bilinear filtering passes, a texture mapping operation that comprises higher order ("N"-linear) interpolation or anisotropic filtering may be performed as $2^{(N-2)}$ bilinear filtering passes, etc. Each texture processing pass may comprise application (multiplication) of a particular number (e.g. 2×2) of calculated interpolation weight values and the particular number (e.g. 2×2) of corresponding texture data values and then accumulation (summation) of the interpolated results. If the texture mapping operation comprises trilinear or higher order texture mapping operation, the summed interpolated results for plural texture processing passes can be suitably combined (e.g. interpolated) to give an output result for the overall trilinear or higher order texture mapping operation in question.

Again, a similar process may be provided in respect of a convolution operation. Thus, the texture filtering circuitry may be operable to perform, and may perform a convolution operation for a convolution position as plural convolution processing passes. A convolution processing pass may, for example, comprise the application (multiplication) of a subset of the set or kernel of weight values to a corresponding subset of the set of input data values for the convolution position, and accumulation (summation) of the weighted results. For example, in a similar manner to a texture processing pass, a convolution pass may comprise application (multiplication) of a particular number (e.g. 2×2 or multiples thereof, such as 4×2 or 4×2) of received weight values and the particular number (e.g. 2×2 or multiples thereof, such as 4×2 or 2×4) of corresponding input data values of the array of input data values and, e.g., then accumulation (summation) of the weighted results. Again, these embodiments can allow the texture mapping apparatus to perform convolution operations in a substantially similar manner to texture mapping operations, and thus reduce or avoid the need for explicit instructions and/or extensive re-configuration of the texture mapping apparatus in order to perform a convolution operation. The accumulated (summed) weighted values of plural convolution processing passes for a convolution operation can then be suitably combined (e.g. accumulated (summed)) to give a combined (e.g. accumulated (summed)) result for the convolution operation for the convolution position in question. The results for plural convolution operations, e.g. for respective convolution positions, can be suitably combined (e.g. by the texture mapping apparatus or data processing circuitry) to give an output array for the overall convolution being performed on the overall array of input data values.

In embodiments, the texture mapping apparatus (texture fetching circuitry) may be operable to generate or "spawn", and may generate or "spawn", indices for a set of texture data values to which calculated interpolation weight values will be applied. The generation or "spawning" of indices for texture data values may follow a "spawning pattern" over the texture data values of the array in question. The spawning pattern can follow any desired and suitable (space-filling) curve over the texture data values. In one embodiment, the spawning pattern follows a Morton or Z-order curve over the texture data values. The texture mapping apparatus (texture fetching circuitry) may be operable to calculate, and may calculate, the indices at which an interpolated weight value will be applied to a corresponding texture data value by offsetting (applying one or more offsets to) indices corresponding to the sampling position. This can facilitate generation or "spawning" of indices for a texture processing pass since a predetermined set of offsets can be used in a predetermined order to generate or "spawn" the indices for a particular spawning pattern each time that spawning pattern is used.

Similarly, in embodiments, the texture mapping apparatus (texture fetching circuitry) may be operable to generate or "spawn", and may generate or "spawn", indices for a set or subset of input data values to which received weight values will be applied. The generation or "spawning" of indices for input data values may again follow a "spawning pattern" over the input data values of the array in question. The spawning pattern can again follow any desired and suitable (space-filling) curve over the input data values. In one embodiment, the spawning pattern is substantially similar to that which is used for texture mapping operations. In one embodiment, the spawning pattern again follows a Morton or Z-order curve over the input data values. The texture mapping apparatus (texture fetching circuitry) may be operable to calculate, and may calculate, the indices at which a received weight value will be applied to a corresponding input data value by offsetting (applying one or more offsets to) indices corresponding to the convolution position. Again, this can facilitate generation or "spawning" of indices for a convolution processing pass since a predetermined set of offsets can be used to generate or "spawn" the indices for a particular spawning pattern each time one or more of those spawning patterns are used, e.g. for one or more convolution operations. Again, these embodiments can also allow the texture mapping apparatus to perform convolution operations in a substantially similar manner to texture mapping operations, and thus reduce or avoid the need for explicit instructions and/or extensive re-configuration of the texture mapping apparatus in order to perform a convolution operation.

The sets of texture data values (e.g. the texture data values covered by a given spawning pattern) may comprise any desired and suitable number of texture data values. A set of texture data values may comprise a (e.g. contiguous) block of texture data values within the array of texture data values. A set of texture data values can have any desired and suitable shape in terms of input data values, such as rectangular (including square). In one embodiment, a set of texture data values is rectangular, and in an embodiment square, in shape. For example, the set of texture data values may comprise 2×2 texture data values. In embodiments, a set of interpolation weight values for a texture mapping operation can also take any desired and suitable form. For example, the set of interpolation weight values may comprise 2×2 interpolation weight values (e.g. corresponding to 2×2 texture data values).

Similarly, the sets and subsets of input data values (e.g. the input data values covered by a given spawning pattern) may comprise any desired and suitable number of input data values. A set or subset of input data values may comprise a (e.g. contiguous) block of input data values within the array of input data values. A set or subset of input data values can have any desired and suitable shape in terms of input data values, such as rectangular (including square).

In one embodiment, a set of input data values is rectangular, and in an embodiment square, in shape. For example, a set of input data values may comprise a square array of up to 16×16 input data values (e.g. 3×3, 5×5, 11×11, etc. input data values). Rectangular arrays of input values, such as 5×3 or 3×5, would also be possible, if desired. A set of input data values will typically correspond in size and shape to the set or kernel of weight values that will be used for the convolution operation. For example, the set of weight values or "kernel" may comprise up to 16×16 weight values (e.g. 3×3, 5×5, 11×11, etc. or 5×3 or 3×5, etc., weight values). As indicated above, the set or kernel of weight values may form part of a larger set or atlas of weight values stored in memory. The sets or kernels of weight values may be provided within respective (e.g. 16×16 blocks) in the larger set or atlas of weight values.

In one embodiment, a subset of input data values is rectangular, and in an embodiment oblong, in shape. In one embodiment, a subset of input data values may comprise the same or a multiple of (e.g. two times) the number of data values that are in a set of texture data values. This can allow substantially the same spawning mechanism that was used for a texture mapping operation, e.g. for a texture processing pass, to be used (e.g. multiple times, such as twice) to spawn indices for a convolution operation, e.g. for a convolution processing pass. For example, as discussed above, a set of texture data values may comprise 2×2 texture data values and/or a subset of input data values may comprise 2×2 input data values or multiples thereof, such as 2×4 input data values or 4×2 input data values. Similarly, in embodiments, the number of values in a subset of a set of weight values for a convolution operation may be substantially the same as or a multiple of the number of values in a set of interpolation weight values for a texture mapping operation. For example, as discussed above, the subset of the set of weight values may comprise 2×2 weight values or multiples thereof, such as 2×4 weight values or 4×2 weight values. Again, these embodiments can allow the texture mapping apparatus to perform a convolution operation in a substantially similar manner to a texture mapping operation, and thus reduce or avoid the need for extensive re-configuration of the texture mapping apparatus in order to perform a convolution operation.

In one embodiment, a combination of vertically and horizontally orientated (oblong) subsets (blocks) of input data values may be processed when performing plural convolution passes for a convolution operation. As will be discussed in more detail below, this can provide for more efficient processing when applying certain sets or kernels of weight values to certain sets or windows of input data values. For example, 6 vertically orientated (oblong) subsets of 4×2 data values are covered by a 5×5 kernel and thus 6 spawning patterns (and 6 cycles of operation) may be needed for a single application of that 5×5 kernel in the convolution operation. However, only 4 vertically orientated (oblong) subsets of data values and 1 horizontally orientated (oblong) subset of input data values (and thus only 5 subsets of data values in total) can instead cover a 5×5 kernel and thus only 5 spawning patterns (and 5 cycles of operation) may be needed for a single application of that 5×5 kernel in the convolution operation.

The texture fetching circuitry may comprise any desired and suitable processing circuitry operable to perform the functions described herein. This processing circuitry may be in the form of one or more dedicated hardware elements that are configured appropriately, or it may comprise programmable processing circuitry that has been programmed appropriately.

The texture fetching circuitry may further comprise a local storage unit operable to store input data values and/or weight values locally to the texture mapping apparatus. The local storage unit may comprise plural addressable storage regions operable to store the input data values and/or weight values. The texture fetching circuitry may be operable to store, and may store, a (e.g. entire) subset of a set of input data values to be used when performing a convolution processing pass for a convolution position within a single addressable storage region of the local storage unit. This can improve performance by helping to avoid the need for a subset of input data values to be read from more than one addressable storage region for a given convolution processing pass (e.g. for a given spawning pattern).

For example, the local storage unit may comprise a local cache. The local cache may, for example, comprise plural addressable storage regions in the form of plural cache lines. The cache and/or its cache lines may be operable to store, and may store, any desired and suitable amount of data. In one embodiment, a cache line can store 16×8 data values. In one embodiment, a cache line can store 128 bytes of data (16×8 data values×1 byte (8 bits) per data value). In embodiments, the texture fetching circuitry may be operable to align, and may align, the data for subsets of input data values for convolution processing passes (e.g. spawning patterns) with the cache lines, such that a (or each) subset of input data values for a convolution processing pass (e.g. a spawning pattern) does not straddle two or more cache lines. Thus, in embodiments, the texture fetching circuitry may be operable to store, and may store, a (e.g. entire) subset of a set of input data values to be used when performing a convolution processing pass for a convolution position within a single cache line. The local cache may store fetched texture or input data values and/or fetched weight values. The local cache may comprise one or more cache lines for storing fetched texture or input data values and/or one or more cache lines for storing fetched weight values. However, in other embodiments, to simplify operation (read scheduling), the local cache may store fetched texture or input data values, but not fetched weight values.

The local storage unit (whether in the form of a cache or as some other form of storage) may comprise a local RAM.

The local RAM may, for example, comprise plural addressable storage regions in the form of plural RAM banks. The RAM and/or its RAM banks may be operable to store, and may store, any desired and suitable amount of data. In one embodiment, a RAM bank stores data values for 8×4 data values. In one embodiment, a RAM bank can store 32 bytes of data (8×4 data values×1 byte (8 bits) per data value). In embodiments, the texture fetching circuitry may be operable to align, and may align, the data for subsets of input data values for convolution processing passes (e.g. spawning patterns) with the RAM banks, such that a (or each) subset of input data values for a convolution processing pass (e.g. a spawning pattern) does not straddle two or more RAM banks. Thus, in embodiments, the texture fetching circuitry may be operable to store, and may store a (e.g. entire) subset of a set of input data values to be used when performing a convolution processing pass for a convolution position within a single RAM bank. The local RAM may store fetched texture or input data values and/or fetched weight values. The local RAM may comprise one or more RAM banks for storing fetched texture or input data values and/or one or more RAM banks for storing fetched weight values.

The texture fetching circuitry may be further operable to, in response to an instruction to use texture or input data values and/or weight values for an operation, first determine whether or not those data values and/or weight values are already stored locally (have already been fetched from memory), e.g. are in the local cache. When those data values and/or weight values are not already stored locally (have not previously been fetched from memory and, e.g. are not cached), then the texture fetching circuitry may fetch those data values and/or weight values from memory. The fetched data values and/or weight values may then be stored by the data fetching unit in the local cache (e.g. for future re-use by the texture filtering circuitry) and/or in other local storage (e.g. for immediate use by the texture filtering circuitry). However, when those data values and/or weight values are already stored locally (have already been fetched from memory and, e.g. are cached), then the texture fetching circuitry may not fetch those data values and/or weight values from memory.

The texture fetching circuitry may be operable to fetch, and may fetch, two or more sets of texture data values (e.g. from respective "mipmaps") in parallel, e.g. to perform trilinear interpolation. Embodiments may exploit this feature of the texture fetching circuitry by operating the texture fetching circuitry so as to fetch two or more (e.g. 2×2) parts of a (e.g. 2×4 or 4×2) subset of input data values in parallel. Again, these embodiments can allow the texture mapping apparatus to perform a convolution operation in a substantially similar manner to a texture mapping operation, and thus reduce or avoid the need for extensive re-configuration of the texture mapping apparatus in order to perform a convolution operation.

The texture fetching circuitry may further comprise a parking buffer. The parking buffer may comprise a record of one or more outstanding (e.g. processing passes for) convolution operations and/or texture mapping operations to be performed (e.g. that may still be waiting on data to be fetched from memory). When (e.g. one or more processing passes for) a convolution operation and/or texture mapping operation is determined as being ready to be performed, the texture filtering circuitry may read and then use the fetched data for (the one or more passes for) the operation.

The texture filtering circuitry can also comprise any desired and suitable processing circuitry operable to perform the functions described herein. This processing circuitry may be in the form of one or more dedicated hardware elements that are configured appropriately, or it may comprise programmable processing circuitry that has been programmed appropriately. In one embodiment, a dedicated hardware texture mapping apparatus, and thus dedicated texture filtering circuitry (hardware), is used.

The texture filtering circuitry may comprise circuitry operable to read input or texture data values stored locally to the texture mapping apparatus (e.g. in the local storage) and then use those data values to perform a convolution or texture mapping operation. The texture filtering circuitry may further comprise circuitry operable to, in the case of a convolution operation, read weight values stored locally to the texture mapping apparatus and use those read weight values to perform a convolution operation. The texture filtering circuitry may further comprise circuitry operable to, in the case of a texture mapping operation, (e.g. internally) calculate interpolation weight values to be used in a texture mapping operation and use those calculated interpolation weight values to perform a texture mapping operation.

In embodiments, a texture or input data value can take any desired and suitable form. For example, a texture or input data value may be represented by 8 bits (and thus may take an integer value between 0 and 255). As discussed above, in embodiments, the one or more arrays of data values on which the convolution or texture mapping operation is to be performed can also take any desired and suitable form. In the case of a texture mapping operation, the one or more arrays may comprise image or graphics data values (e.g. for an image or texture). In the case of a convolution operation, the one or more arrays may comprise image or graphics data values (e.g. for an image or texture) or non-image/non-graphics data values. A texture or input data value may be provided as part of a data element of an array of data elements. For example, a data element may comprise three data values (e.g. RGB or YUV) or four data values (e.g. RGBa or YUVa). The data values of a data element may be processed in parallel by the texture mapping apparatus.

In embodiments, a calculated interpolation weight value or received weight value can also take any desired and suitable form. For example, in the case of a texture mapping operation, a calculated interpolation weight value may comprise a fixed point value (e.g. between 0.0 and 1.0). A calculated interpolation weight value may be represented by 9 bits. However, in the case of a convolution operation, a received weight value may comprise an integer value (e.g. between 0 and 255 or between −128 and 127). A received weight value may be represented by 8 bits (unsigned) or 9 bits (signed). For example, weight values may be represented externally (in memory) using 8-bits (signed or unsigned), and internally using 9-bits (signed). Thus, the texture mapping apparatus may be operable to use, and may use, both fixed point weight values and integer weight values. Furthermore, in the case of a texture mapping operation, the set of interpolation weight values used may sum to a normalisation value (e.g. may sum to 1 in order to preserve brightness). However, in the case of a convolution operation, the set or kernel of weight values used may sum to a particular value (e.g. may sum to 0 for edge detection) or may not sum to a particular value. Thus, as will be discussed in more detail below, the texture mapping apparatus may be operable to output, and may output, a result for a convolution operation that would be consider as being "out of range" for a texture mapping operation. The texture mapping apparatus may accordingly be operable to handle such "out of range" output values.

In embodiments, the data values and/or weight values stored in the memory may be encoded. Thus, embodiments may comprise the texture mapping apparatus decoding the fetched data values and/or fetched weight values prior to using those values. These embodiments can exploit the existing decoding functionality of the texture mapping apparatus. The texture mapping apparatus may, for example, use the same circuitry to decode both data values and weight values, thus reducing or avoiding the need for additional circuitry to decode the weight values. The decoding can take any desired and suitable form, such as decrypting and/or decompressing. The encoding scheme used to encode the values may, for example, allow random access into the array in question, e.g. without the need to decode the entire array. The encoding scheme used to encode the values may, for example, comprise a block-based encoding scheme. The encoding scheme used to encode the values may, for example, comprise an image or graphics (texture) compression scheme. The encoding scheme used to encode the values may, for example, comprise Adaptive Scalable Texture Compression (ASTC) or Arm Frame Buffer Compression (AFBC).

As discussed above, the convolution or texture mapping operation may comprise generating an output result (value) for a convolution or sampling position. The output result (value) can take any desired and suitable form. As discussed above, in the case of a texture mapping operation, the set of weight values used may sum to a particular value (e.g. may sum to 1 in order to preserve brightness). Thus, the output result for a texture mapping operation will usually fall within a particular range (e.g. the range of data values that the data values in the array of input data values (texture) can have). However, as is also discussed above, in the case of a convolution operation, the set of weight values used may not sum to a particular value. Thus, in embodiments, the texture filtering circuitry may be able to generate and output results for convolution operations that are within a relatively larger range (e.g. greater than the range of data values that the data values in the array of input data values can have).

The texture mapping apparatus can be controlled and operated in the manner of the technology described herein in any desired and suitable way. As discussed above, in an embodiment, an appropriate convolution operation instruction is provided to the texture mapping apparatus, in response to which the texture mapping apparatus will perform the convolution operation.

As discussed above, the convolution operation instruction in an embodiment indicates that a convolution operation is to be performed, the set of input data values on which the convolution operation is to be performed, and a set or kernel of weight values to be applied to the input data values for the convolution operation. In an embodiment, the convolution operation instruction indicates where the input data values, and, in an embodiment, also where the set or kernel of weight values, for the convolution operation are stored, with the texture mapping apparatus (e.g. appropriate texture fetching circuitry of the texture mapping apparatus) then fetching the input data values and, in an embodiment, the set or kernel of weight values, from where they are stored in response to the instruction. The texture mapping apparatus in an embodiment also performs (e.g., and in an embodiment, by texture filtering circuitry of the texture mapping apparatus) the convolution operation on the indicated set of input data values using the indicated (e.g., and in an embodiment, fetched) set or kernel of weight values.

Thus, in an embodiment, the texture mapping apparatus includes data processing circuitry operable to receive a convolution operation instruction, and to, in response to receiving the convolution operation instruction, control texture fetching circuitry of the texture mapping apparatus to fetch input data values on which the convolution operation is to be performed, and, in an embodiment, fetch a set or kernel of weight values to use for the convolution operation, and to cause texture filtering circuitry of the texture mapping apparatus to perform the convolution operation on the fetched set of input data values using the indicated (and in an embodiment fetched) set or kernel of weight values.

The convolution operation instruction can be provided to the texture mapping apparatus in any suitable and desired manner. For example another processor and/or data processing circuitry that the texture mapping apparatus is associated with (e.g. that is part of a graphics processing unit and/or CPU that the texture mapping apparatus is associated with) could provide the instruction to the texture mapping apparatus.

For example, an appropriate convolution operation instruction could be included in a shader program to be executed by a programmable shader core of a graphics processing unit, and be recognised by the programmable shader core as a convolution operation instruction, with the shader core then operating to send appropriate instructions to the texture mapping apparatus to perform the convolution operation (and return the result of the convolution operation to the shader core for further processing and/or other use).

Thus, in embodiments, an appropriate convolution operation instruction can be (and is) included in a program to be executed by programmable data processing circuitry, e.g. of a programmable execution unit, such as a programmable fragment shader, of a processor such as a graphics processing unit or CPU, that the texture mapping apparatus is associated with, and can be recognised by the programmable processing circuitry as a convolution operation instruction, with the programmable processing circuitry then operating to send appropriate instructions to the texture mapping apparatus to perform the convolution operation (and return the result of the convolution operation to the programmable processing circuitry for further processing and other use).

The sending of a convolution operation instruction to the texture mapping apparatus can be triggered and caused in any suitable and desired way. For example, the overall data processing system operation may allow an application programmer to explicitly specify that a convolution operation is to be performed, e.g. by including an appropriate program expression for the convolution operation in an application program to be executed by programmable processing circuitry, such as a graphics processing unit shader, of the data or graphics processing system that the texture mapping apparatus is part of.

This could be achieved, for example, and in an embodiment, by providing an API extension that includes one or more specific program expressions for a convolution operation (such that an application programs can include a specific program expression when a convolution operation is desired). In this case, the appropriate programmable processing unit (e.g. shader core) compiler should be operable to recognise the specific convolution operation program expression(s) and compile those expression(s) to binary instruction(s) for the programmable processing circuitry so as to cause the convolution operation to be performed using a texture mapping apparatus in line with the technology described herein (e.g. rather than being performed by the programmable processing circuitry itself).

In other arrangements, the convolution operation may not be directly exposed to an application programmer, but the, e.g. compiler, for the programmable processing circuitry may be operable to identify program expressions that are for causing the programmable processing circuitry to perform a convolution operation and then replace those program expressions with an instruction or instructions to cause the convolution operation to be performed using a texture mapping apparatus in the manner of the technology described herein instead.

In such arrangements, the compiler for the programmable processing circuitry can operate as desired, e.g. as part of the driver for the data processing unit (e.g. graphics processing unit) that the programmable processing circuitry (and the texture mapping apparatus) is part of or associated with. Correspondingly, the compiler may identify the presence of a convolution operation at any desired stage of the compilation process, such as from application program expressions, intermediate (partially compiled) instructions, and/or compiled (binary) instructions for a convolution operation.

Other arrangements would, of course, be possible.

A desired convolution operation or operations could be performed using the texture mapping apparatus alone, or it would also be possible to use the texture mapping apparatus to carry out convolution operations in parallel with other appropriate processing elements or units of the overall data or graphics processing system (that are able to perform convolution operations). For example, in the case of a graphics processing unit, convolution operations could be carried out in parallel using both the texture mapping apparatus and a programmable shader core (and in one embodiment this is done). This would then, in effect, allow plural functional units (elements) of a graphics processing unit (e.g.) to perform convolution operations in parallel, thereby facilitating improved convolution operation performance by a graphics processing unit (e.g.).

The graphics texture mapping apparatus that is used in the technology described herein may be, and typically will be, part of an overall graphics and/or data processing system. Thus, the technology described herein also extends to a data or graphics processing system having a texture mapping apparatus as described herein.

The data or graphics processing system may comprise the memory or memories referred to herein, which may be external to the texture mapping apparatus. As discussed above, the memory or memories may be operable to store, and may store, a set or array of input data values to be used in the convolution operation and/or a set or kernel of weight values to be used in the convolution operation. The memory or memories may also be operable to store, and may store, a set or array of texture data values to be used in a texture mapping operation.

The texture mapping apparatus could be provided in a "standalone" form, e.g., and in an embodiment, as a co-processor, in a general data processing system (e.g. in a CPU-based sy stem).

The texture mapping apparatus may, also or instead, be provided as a texture mapping apparatus that is part of a graphics processing unit (GPU), e.g., and in an embodiment, in a graphics processing system (or an overall data processing system).

In an embodiment, the texture mapping apparatus is part of an overall graphics processing unit that the texture mapping apparatus belongs to. The technology described herein accordingly also extends to a graphics processing unit comprising a texture mapping apparatus as described herein.

Where the texture mapper is part of a graphics processing unit, the graphics processing unit (graphics processor) may be operable to implement and execute a graphics processing pipeline to perform graphics or other data processing. The graphics processing unit (processing pipeline) may include any one or more or all of the processing stages that a graphics processor (processing pipeline) can normally include. Thus, for example, the graphics processing unit may include a primitive setup stage, a rasteriser and/or a renderer. In an embodiment, the renderer may be in the form of or include a programmable fragment shader (a shader core).

The graphics processor (processing pipeline) may also comprise one or more programmable shading stages, such as one or more or all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The technology described herein can be used in and with any suitable and desired graphics processing system and processor. The technology described herein is particularly suitable for use with tiled renderers (tile-based graphics processing systems). Thus, in one embodiment, the graphics processor (processing pipeline) is a tiled-based graphics processor (processing pipeline).

Thus, as will be appreciated, embodiments may be implemented in a data processing system comprising a memory and a graphics processing unit (GPU) (a graphics processor) comprising a texture mapping apparatus as described herein. In an embodiment, the data processing system may further include a host processor that executes applications that can require data or graphics processing by the graphics processing unit and that instruct the graphics processing unit accordingly (e.g. via a driver for the graphics processing unit). The system may further include appropriate storage (e.g. memory), caches, etc.

Correspondingly, embodiments may be implemented in a data processing system comprising a memory and a host processor (a CPU) and a texture mapping apparatus as described herein. The texture mapping apparatus will be provided as and act as a co-processor of the data processor system (for the host processor (CPU)). The system may further include appropriate storage (e.g. in memory), caches, etc.

The data or graphics processing system and/or graphics processing unit and/or texture mapping apparatus may also comprise, and/or be in communication with, one or more memories and/or memory devices that store the data described herein, and/or that store software for performing the processes described herein. The data or graphics processing system and/or graphics processing unit and/or texture mapping apparatus may also be in communication with a host microprocessor, and/or with a display for displaying images based on the data generated.

The technology described herein can be used for any form of output that a graphics texture mapper and graphics or data processing unit and system may be used to generate. In one embodiment it is used when a graphics processing unit is being used to generate images for display, but it can be used for any other form of graphics or data processing output, such as (e.g. post-processed) graphics textures in a render-to-texture operation, etc., that a graphics processing unit may produce, as desired. It can also be used when a texture mapper, or, graphics processing unit, etc., is being used to generate other (e.g. non-image or non-graphics) outputs, such as one or more intermediate (convolution layer) outputs (arrays) or final outputs (values or arrays) from an artificial neural network.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that the various functions, etc., of the technology described herein may be duplicated and/or carried out in parallel on a given processor. Equally, the various processing stages may share processing circuitry, etc., if desired.

Furthermore, any one or more or all of the processing stages or units of the technology described herein may be embodied as processing stage or unit circuitry, e.g., in the form of one or more fixed-function units (hardware) (processing circuitry), and/or in the form of programmable processing circuitry that can be programmed to perform the desired operation. Equally, any one or more of the processing stages or units and processing stage or unit circuitry of the technology described herein may be provided as a separate circuit element to any one or more of the other processing stages or units or processing stage or unit circuitry, and/or any one or more or all of the processing stages or units and processing stage or unit circuitry may be at least partially formed of shared processing circuitry.

The technology described herein should (and in an embodiment does) produce some useful output data e.g. displaying the output of the convolution operation or classifying images based on the output of the convolution operation.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed above, the technology described herein relates to a graphics texture mapping apparatus, e.g. for a graphics processing unit. The texture mapping apparatus comprises texture fetching circuitry that receives a set of weight values for a convolution operation and fetches from memory a set of input data values on which the convolution operation is to be performed. The texture mapping apparatus further comprises texture filtering circuitry that performs a convolution operation using the set of received weight values and the set of fetched input data values. The texture mapping apparatus can allow, e.g., a graphics processing unit to perform a variety of convolution operations in an efficient manner.

Embodiments of the technology described herein will now be described with reference primarily being made to convolution operations being performed on image or graphics data. However, in other embodiments, convolution operations can be performed by the texture mapping apparatus on other types of data (non-image or non-graphics data).

FIG. 1 shows schematically elements of a graphics processing unit (GPU) 100 that are relevant to the operation of the present embodiments. As will be appreciated by those skilled in the art, there may be other elements of the GPU 100 that are not illustrated in FIG. 1. In the present embodiment, the GPU 100 is a tile-based graphics processor. However, other arrangements are possible.

As shown in FIG. 1, the GPU 100 comprises data processing circuitry that implements a graphics processing pipeline. The pipeline includes, inter alia, a rasterizer 102 and a renderer in the form of a programmable shader core 104. The pipeline uses a buffer 106 (e.g. in external memory 108) for storing an output array (e.g. frame or image to be displayed). The GPU 100 is in communication with the external memory 108, but the external memory 108 does not form part of the GPU 100 and instead forms part of an overall host data processing system that comprises, inter alia, the GPU 100 and memory 108.

The memory 108 will store, inter alia, graphics textures to be used by the GPU 100 when performing texture mapping operations. In this embodiment, the memory 108 will also store weight values and arrays of input data values (e.g. textures or images) to be used when performing convolution operations. The memory 108 may, e.g., be a disk drive or other storage medium (e.g. a hard disk, a raid array of hard disks or a solid state disk) of or accessible to the host system in which the GPU 100 is located, and may be an internal storage medium of the host system, or an external or removable storage medium.

The GPU 100 further comprises a texture mapping apparatus 110. As shown in FIG. 1, the texture mapping apparatus 110 comprises texture fetching circuitry 112, which in this embodiment includes an input parameter fetching unit 114, a coordinate computation unit 116, a texture cache lookup unit 118, and a data fetching unit 120. The texture mapping apparatus 110 further comprises texture filtering circuitry 122, which in this embodiment comprises a texture filtering unit 124.

The arrows in FIG. 1 indicate the main ways in which data flows between the various components of the GPU 100 and the memory 108. There may also be other communication routes or directions that are not indicated.

The rasterizer 102 can receive, as its input, primitives (e.g. triangles) to be used to generate a render output, such as a frame to be displayed, and rasterizes those primitives into individual graphics fragments for processing. To do this, the rasterizer 102 rasterizes the primitives to sample points representing the render output, and generates graphics fragments representing appropriate sampling positions for rendering the primitives. The fragments generated by the rasterizer 102 are then sent onwards to the shader core (renderer) 104 for shading.

In this embodiment, the shader core 104 can execute shader programs for the fragments issued by the rasterizer 102 in order to render (shade) the fragments. The shader programs may have no, one, or more, texturing instructions for texture mapping operations that are required to be executed by the texture mapping apparatus 110.

When a texturing instruction is encountered by the shader core 104, a texturing instruction is sent from the shader core 104 to the texture mapping apparatus 110, requesting the texture mapping apparatus 110 to perform a texturing operation. After the texture mapping apparatus 110 has finished its texture processing (carrying out the texturing instruction), the final result is sent back to the shader core 104 in a response message for use when shading the fragment in question.

The texture mapping apparatus 110 includes suitable processing circuitry to follow texturing instructions. This processing circuitry may be in the form of one or more dedicated hardware elements that are configured appropriately, or it may comprise programmable processing circuitry that has been programmed appropriately. In this embodiment, a dedicated hardware texture mapping apparatus 110 is used.

When instructed by the shader core 104 to perform a texture mapping operation, the texture mapping apparatus 110 reads textures from the memory 108 (as required), performs the texture mapping operation, and returns a (e.g. RGB) colour sampled from the texture back to the shader core 104.

As part of this processing, the input parameter fetching unit 114 receives the texturing instruction message from the shader core 104 indicating the texture or textures to be used (e.g. a texture field may be provided that includes a texture descriptor (TXD)), the particular type (e.g. bilinear, trilinear, etc.) of texture mapping operation to perform (e.g. a sampler field may be provided that includes a sampler descriptor (SMD)) and the sampling position coordinates at which to perform the texture mapping operation (e.g. given in a normalized coordinate-system where (0.0, 0.0) is the top-left corner of the texture and (1.0, 1.0) is the bottom-right corner of the texture).

The coordinate computation unit 116 then determines, from the sampling position coordinates, the texel indices in the texture to be looked up from the data fetching unit 120.

The texture cache lookup unit 118 then checks whether the required texture data is already stored in a cache of the data fetching unit 120 and, if not present, fetches the texture data into the texture mapping apparatus 110. For a typical bilinear lookup, texture data from four texels are read from a 2×2 texel region of the texture in memory 108. For a typical trilinear lookup, texture data from two sets of four texels are read from two 2×2 texel regions of respective texture "mipmaps" in memory 108.

The texture filtering unit 124 then reads in the four texels of each bilinear lookup, determines interpolation weight values and computes an interpolated result from the texture data values for the sampling position in question. In the case of trilinear interpolations, the results of two bilinear lookups are combined into a result for the sampling position in question. The result is then output to (returned to) the shader core 104.

The "shaded" fragment from the shader core 104 is then stored as part of the output render target in the buffer 106, e.g. in the memory 108, e.g. for subsequent post-processing or display.

In this embodiment, the shader core 104 can also execute programs that comprise no, one, or more, convolution instructions (convolution operations) for a convolution to be performed. In the present embodiment, these programs may, for example, implement image post-processing. However, in other embodiments, these programs may implement one or more convolution layers of an artificial (convolutional) neural network.

When a convolution instruction is encountered by the shader core 104, a convolution instruction message is sent from the shader core 104 to the texture mapping apparatus 110, requesting the texture mapping apparatus 110 to perform the convolution operation. After the texture mapping apparatus 110 has finished its convolution operation (carrying out the convolution instruction), the result is sent back to the shader core 104 in a response message.

The texture mapping apparatus 110 again includes suitable processing circuitry to follow convolution instructions. This processing circuitry may be in the form of one or more dedicated hardware elements that are configured appropriately, or it may comprise programmable processing circuitry that has been programmed appropriately. As discussed above, in this embodiment, a dedicated hardware texture mapping apparatus 110 is used.

When instructed by the shader core 104 to perform a convolution operation, the texture mapping apparatus 110 reads elements of an array of input data values (e.g. an image, texture or other data array) and a set or "kernel" of weight values from the memory 108 (as required), performs the convolution operation, and returns the result back to the shader core 104. In this embodiment, the shader core 104 combines the results from plural convolution operations into an output array (e.g. a processed image, texture or other data array).

As part of this processing, the input parameter fetching unit 114 receives the convolution instruction message from the shader core 104. In this embodiment, the convolution instruction indicates the array of input data values to be processed, the convolution position at which to perform the convolution operation (e.g. given as indices where 0,0 is the top-left corner of the array of input data values), a kernel atlas to use, the position of the kernel to use within the kernel atlas (e.g. given as indices where 0,0 is the top-left corner of the atlas) and the kernel size.

The convolution instruction may, for example, take the form TEX_CONVOLVE (texture, sampler, tex_coord, kernel_position, kernel_size), where: the texture field indicates a texture descriptor (TXD) that indicates the array of input data values to which the convolution operation will be applied (the texture field could include the descriptor itself, or a pointer to where the descriptor is stored, or an index into a table of pointers, etc.); the sampler field further includes a sampler descriptor (SMD) that indicates the kernel atlas containing the particular kernel of weight values to use in the convolution operation (the sampler field could again include the descriptor itself, a pointer to where the descriptor is stored, or an index into a table of pointers, etc.); the tex_coord field indicates, e.g. with indices, the convolution position within the array of input data values at which the convolution operation will be performed; the kernel_position field indicates the location within the kernel atlas of the particular kernel of weight values to use in the convolution operation; and the kernel_size field indicates the size and shape of the particular kernel of weight values to use in the convolution operation (e.g. 5×5, 3×3, 5×3 or 3×5, etc.).

In this embodiment, the kernel_position field comprises a 16 bit value for each of two orthogonal array directions. Thus, the kernel atlas can be up to 65536×65536 (64K×64K) weight values in size. In this embodiment, the kernel_size field comprises a 4 bit value for each of two orthogonal array dimensions. Thus, the kernel can be up to 16×16 weight values in size.

The coordinate computation unit 116 then determines the indices in the array of input data values to be looked up from the data fetching unit 120.

The texture cache lookup unit 118 then checks whether the required input data values and weight values are stored in a cache of the data fetching unit 120 and, if not present, fetches those values into the texture mapping apparatus 110. In other embodiments, the shader core 104 may provide the texture mapping apparatus 110 with the set of weight values to use, rather than the texture mapping apparatus 110 fetching the set of weight values from memory 108.

The texture filtering unit 124 then reads in the elements of the array of input data values and kernel of weight values, and computes a weighted sum of the input data for the convolution position in question. This is then output to (returned to) the shader core 104. The shader core 104 then combines the outputs for the convolution positions into an output array for the overall convolution of the array of input data values.

The output array from the shader core 104 is then stored in the buffer 106, e.g. in the memory 108, e.g. for subsequent output (e.g. display).

Other arrangements for the graphics processing unit and system would, of course, be possible.

FIG. 1 accordingly shows an overview of a GPU 100 comprising a texture mapping apparatus 110 according to an embodiment of the technology described herein. However, it should be noted that FIG. 1 is only schematic and that various components and connections have been omitted from that Figure for the sake of clarity.

Figure 2:
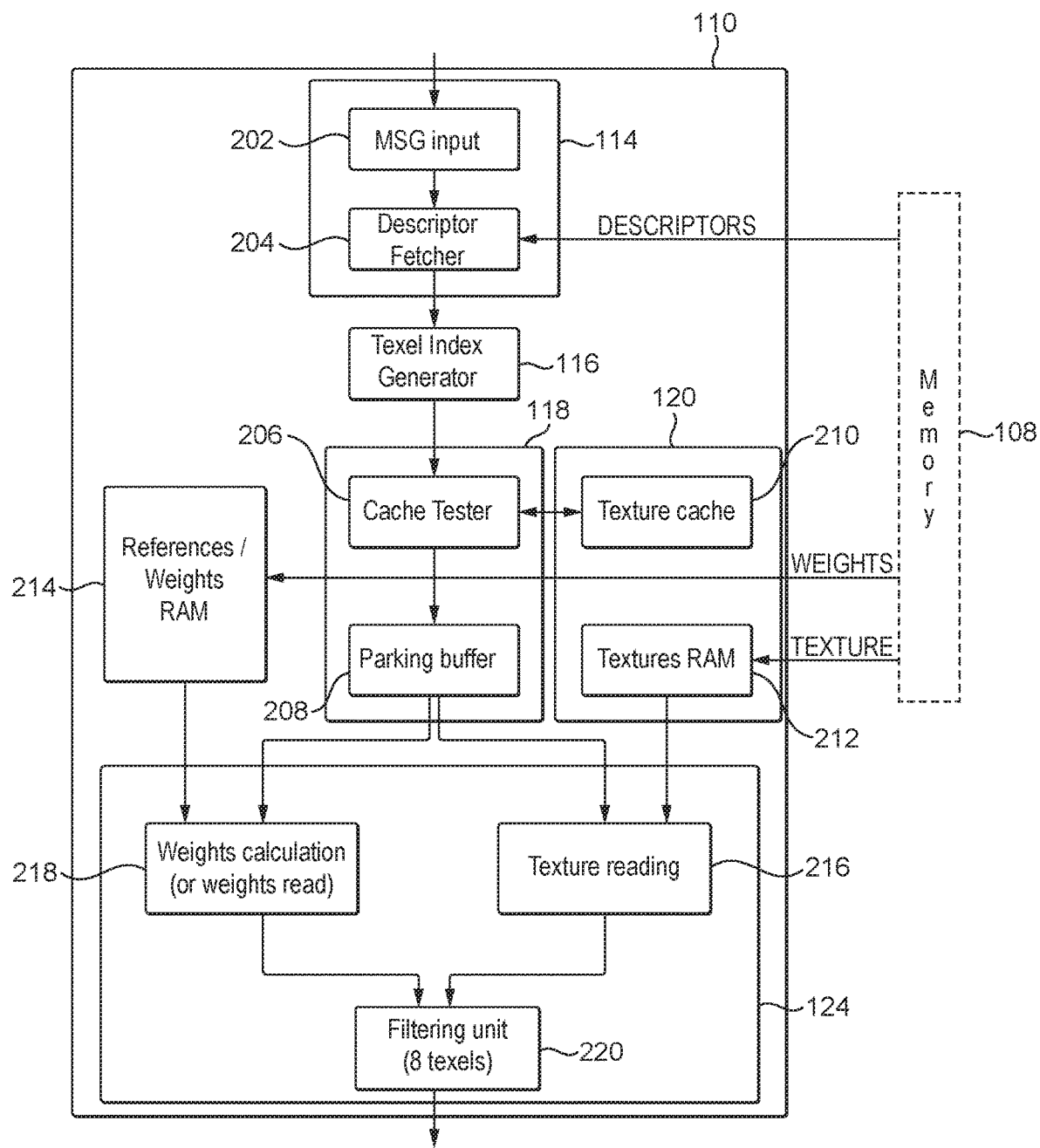
FIG. 2 shows schematically and in more detail a texture mapping apparatus according to an embodiment of the technology described herein.

FIG. 2 shows the texture mapping apparatus 110 in further detail. As is shown in FIG. 2, the input parameter fetching unit 114 of the texture mapping apparatus 110 comprises an instruction message input unit 202 that receives either a texturing instruction or a convolution instruction from the shader core 104. The input parameter fetching unit 114 further comprises a descriptor fetching unit 204 that retrieves input parameters for the convolution or texture mapping operation from memory 108. The descriptors are described in more detail below with reference to FIG. 4.

The input parameters are then passed to the coordinate computation unit 116 where the actual indices for the data values are generated. The process of generating or "spawning" the indices for processing the data values is described in more detail below with reference to FIG. 3.

As is also shown in FIG. 2, the texture cache lookup unit 118 comprises a cache tester 206 which determines whether the required data is already cached locally. If the required data is not cached locally, a request is made to fetch the required data from memory 108. The processing passes for performing the convolution or texture mapping operation are then parked in a parking buffer 208 of the texture cache look up unit 118 to await processing (e.g. pending the required data being fetched from memory 108).

As is shown in FIG. 2, the data fetching unit 120 comprises a texture cache 210. The texture cache 210 comprises individually addressable cache lines that can store input data values (in the case of a convolution operation) or texture data values (in the case of a texture mapping operation) locally to the texture mapping apparatus 110. The data fetching unit 120 further comprises a textures RAM 212 comprising individually addressable RAM banks that can store input data values (in the case of a convolution operation) or texture data values (in the case of a texture mapping operation) locally to the texture mapping apparatus 110. The data fetching unit 120 also comprises further internal storage in the form of a weights RAM 214 that can store weight values locally to the texture mapping apparatus 110.

As is shown in FIG. 2, the texture filtering unit 124 comprises a texture reading unit 216 that receives a processing pass for a convolution or texture mapping operation from the parking buffer 208 and reads the required data for that pass from the textures RAM 212. The texture filtering unit 124 further comprises a combined weights read/calculation unit 218 that also receives the processing pass for the convolution or texture mapping operation from the parking buffer 208 and either reads weight values from the weights RAM 214 (in the case of a convolution operation) or calculates interpolation weight values (in the case of a texture mapping operation). The texture filtering unit 124 further comprises a filtering unit 220 that multiplies the respective data values by their respective weight values and combines the results of the multiplications to provide an output value for the processing pass in question.

In this embodiment, the filtering unit 220 can perform either two bilinear filtering passes in parallel (e.g. for two bilinear processing operations or for a single trilinear processing operation) or one convolution processing pass per cycle of operation. In either case, 8 weight values are applied to 8 input data values per cycle of operation.

FIG. 2 accordingly shows an overview of a texture mapping apparatus 110 according to an embodiment of the technology described herein. However, it should again be noted that FIG. 2 is only schematic and that various components and connections have been omitted from that Figure for the sake of clarity.

Figure 3:
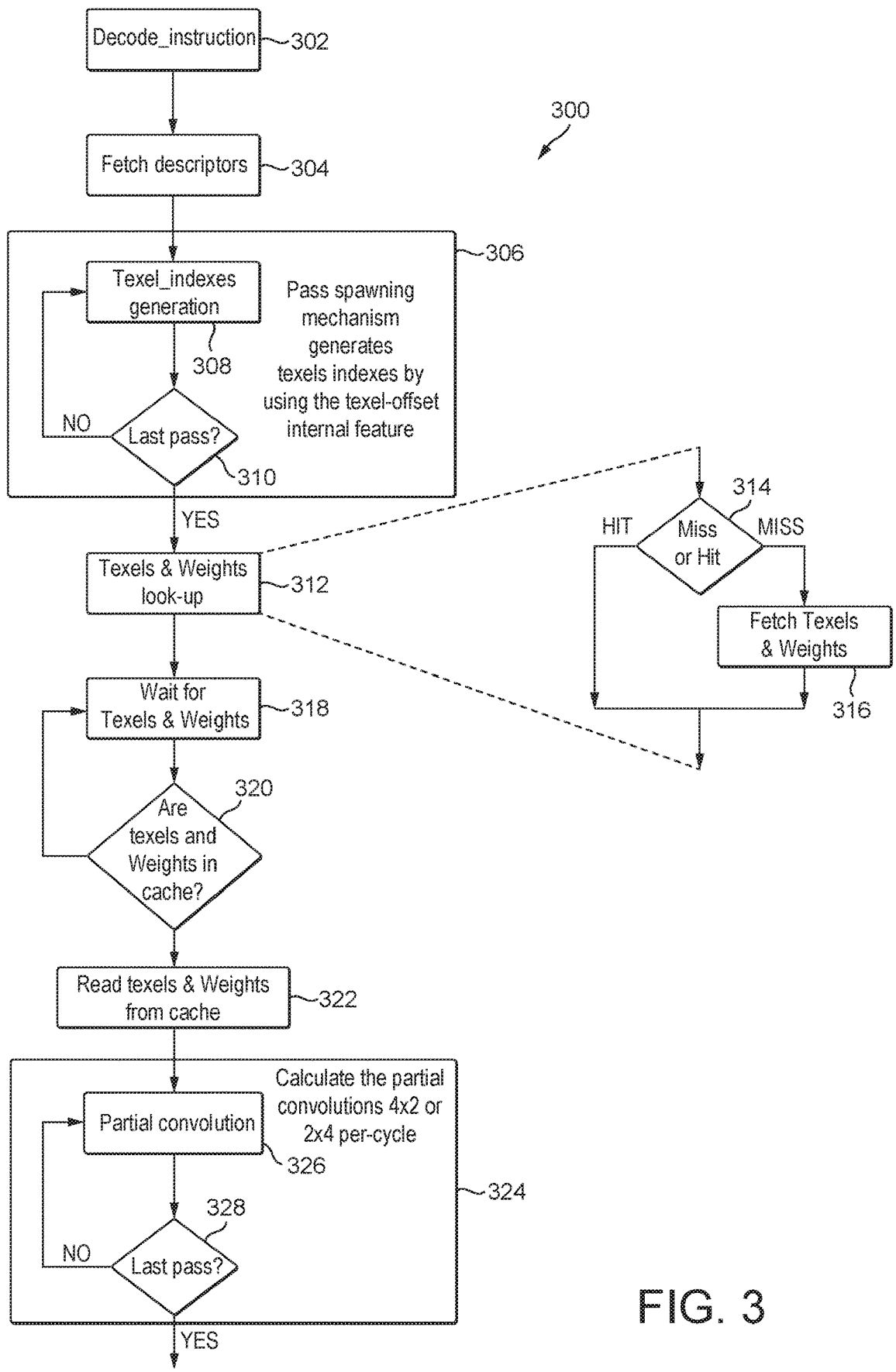
FIG. 3 shows a method of operating a texture mapping apparatus according to an embodiment of the technology described herein.

FIG. 3 shows a method 300 of performing a convolution operation using the texture mapping apparatus 110 according to an embodiment.

In step 302, the texture mapping apparatus 110 decodes the instructions provided by the shader core 104. Then in step 304, the texture mapping apparatus 110 fetches from the memory 108 the input parameters indicated in the instruction. Then in step 306, the texture mapping apparatus 110 begins a spawning mechanism in which array indices for the required data values for the convolution position in question are generated.

As is shown in FIG. 3, step 306 comprises a first step 308 of generating indices and a second step 310 of determining whether the indices for the final convolution processing pass have been generated. In this embodiment, this comprises using an offset feature of the texture mapping apparatus 110. The offset feature will be described in more detail below with reference to FIGS. 6 and 7. If the indices for the last convolution processing pass have not been generated, the method returns to step 308 to generate the next indices. However, if the indices for the last processing pass have been generated then the spawning mechanism ends.

Then in step 312 the texture mapping apparatus 110 performs a cache lookup for the data values and weights to be used in the convolution operation. As is shown in FIG. 3, step 312 comprises a first step 314 of determining whether or not the required data is already available locally to the texture mapping apparatus 110 (i.e. whether there is a cache miss or a cache hit). If there is a cache miss then in step 316 the required data is fetched from the memory 108. However, if there is a cache hit then there is no need to fetch that data from the memory 108.

Then, in step 318 the texture mapping apparatus 110 waits for the weights for the required data to be stored in the cache. Then, in step 320 the texture mapping apparatus 110 determines whether the required data is stored in the cache. If the required data is not stored in the cache, then the method returns to step 318 to wait for the data to be fetched into the cache. However, if the required data is stored in the cache, then in step 322 the required data is read from the cache.

Then, a step 324 is performed in which the passes for the convolution operation are performed. As is shown in FIG. 3, step 324 comprises a first step 326 of performing a convolution pass and then a second step 328 of determining whether the last convolution processing pass for the convolution operation has been performed. If the last convolution processing pass has not been performed, then the method returns to step 326 to perform the next convolution processing pass. However, if the last convolution processing pass has been performed then the method of performing the convolution operation is complete.

Figure 4:
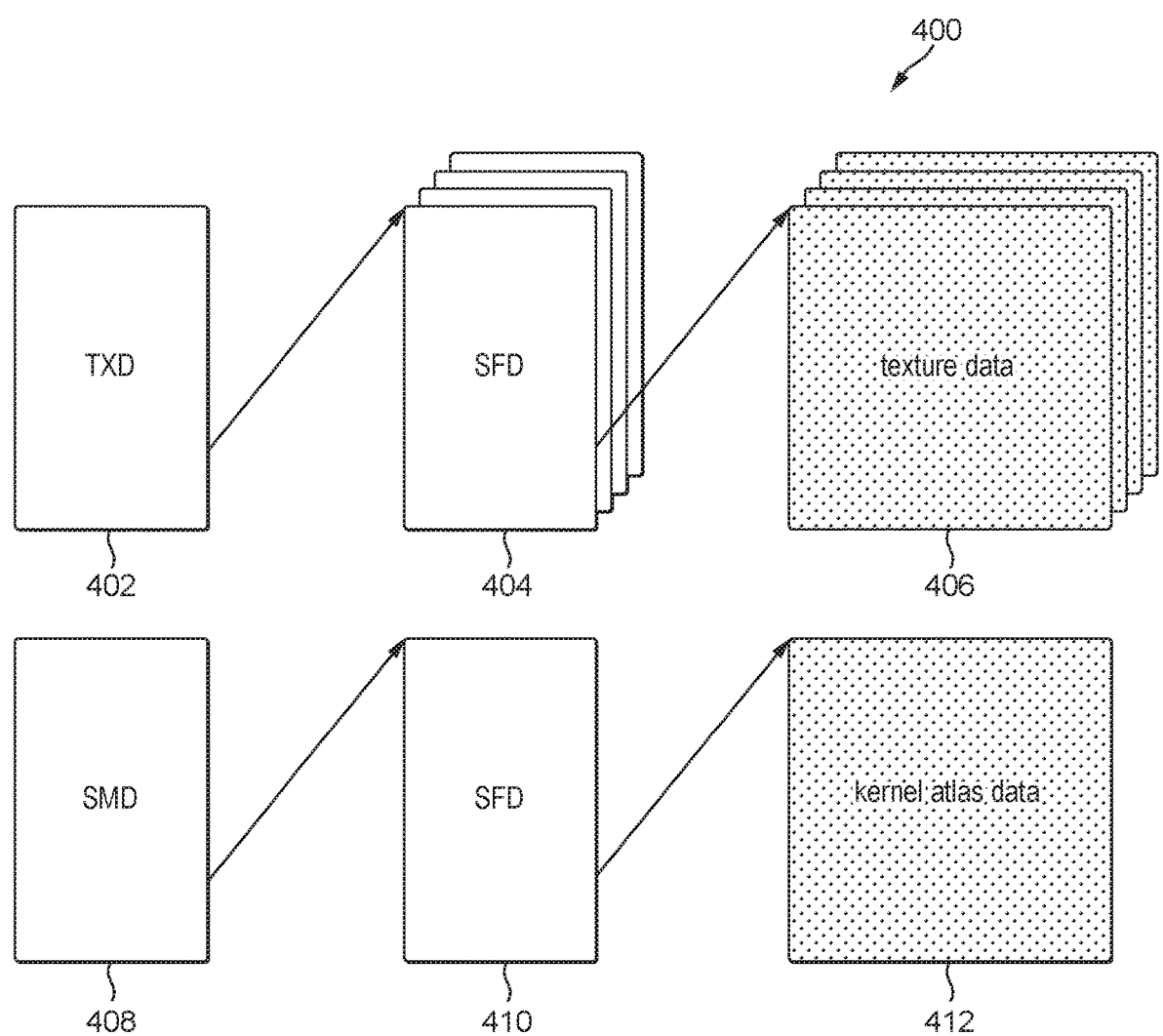
FIG. 4 shows descriptors for texture mapping operations and convolution operations according to an embodiment of the technology described herein.

FIG. 4 shows the descriptors 400 for input parameters used in embodiments of the technology described herein in more detail. The first type of descriptor shown in FIG. 4 is a texture descriptor (TXD) 402, which is used when requesting either a texture mapping operation or convolution operation to be performed. The TXD 402 indicates one or more surface descriptors (SFD) 404 for one or more input arrays or surfaces (textures, images or other arrays) to be used in a convolution or texture mapping operation. Each SFD 404 indicates the parameters for a data array 406 to be used in a convolution or texture mapping operation.

The second type of descriptor shown in FIG. 4 is a sampler descriptor (SMD) 408, which again is used when requesting either a texture mapping operation or a convolution operation. In the case of a texture mapping operation, the SMD 408 would indicate the filtering method (e.g. bilinear, trilinear, etc.) and other parameters to be used for the texture mapping operation. However, in the case of a convolution operation, the SMD 408 indicates a single surface descriptor (SFD) 410 for a kernel atlas comprising the kernel to be used in a convolution operation. The SFD 410 indicates the parameters for a kernel atlas 412 comprising the kernel to be used in the convolution operation.

Figure 5:
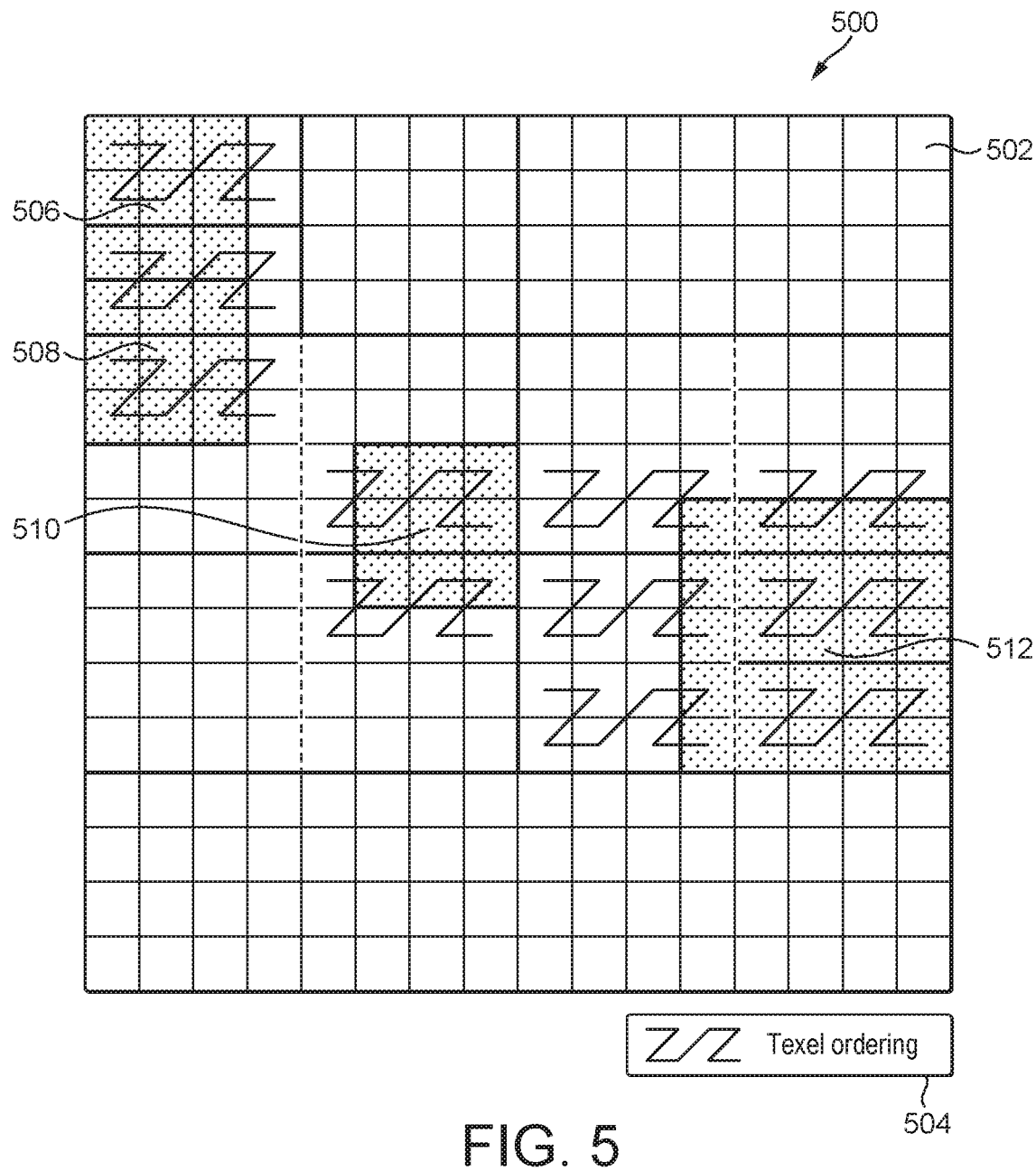
FIG. 5 shows the relationship between input data values, cache lines, RAM banks, kernels of weight values, and input data value indices spawning patterns according to an embodiment of the technology described herein.

FIG. 5 shows the relationship between input data values, cache lines, RAM banks, kernels of weight values, and data array index spawning patterns for processing subsets of input data values according to an embodiment of the technology described herein.

FIG. 5 shows 16×16 elements for an array 500 of input data values on which plural convolution operations (plural applications of a kernel) are to be performed. Each small square shown in FIG. 5 represents an element 502 of the array 500. In this embodiment, each element comprises a data value that is represented in memory by an 8 bit unsigned integer and thus comprises 1 byte of data. Thus, the 16×16 array 500 comprises 256 bytes of data. In other embodiments, each element may comprise three data values (e.g. RGB) or four data values (e.g. RGBa) that are each represented in memory by an 8 bit unsigned integer and thus may comprise 3 or 4 bytes of data.

In this embodiment, each cache line can store 128 bytes of data. Thus, the upper set of 16×8 data values of the array 500 can be, and are, stored in one cache line and the lower set of 16×8 data values of the array 500 can be, and are, stored in another cache line. Furthermore, in this embodiment, each RAM bank can store 32 bytes of data. Thus, a block of 8×4 data values of the array 500 can be, and are, stored in a single RAM bank.

In this embodiment, a spawning mechanism can be performed that spawns indices for processing a subset of 8 input data values. As is shown in FIG. 5, the spawning pattern 504 follows Morton or Z-order, starting in the top-left corner of each subset of input data values. The spawning patterns 504 shown in FIG. 5 are for horizontally orientated subsets of 4×2 data values. However, as will be discussed in more detail below, spawning patterns for vertically orientated subsets of 2×4 data values can also be used. This is achieved by specifying whether the spawning pattern is to be horizontally orientated or vertically orientated with a control bit. The texture mapping apparatus 110 may be operable to determine the number of spawning patterns, spawning start positions, and control bits for a given kernel to be applied.

In this embodiment, the kernels used in the convolution operation can comprise a kernel of 3×3 weight values or a kernel of 5×5 weight values. FIG. 5 shows the relationship between a 3×3 kernel and the RAM banks, the cache lines and the spawning patterns.

As is shown in FIG. 5, the 3×3 kernel requires two spawning patterns (see, e.g., 3×3 kernel 506). As is also shown in FIG. 5, the 3×3 kernel will, at some point in the overall convolution of the array of input data values, straddle the input data values of two RAM banks (see, e.g., 3×3 kernel 508 which straddles two blocks of 8×4 data values). However, as is shown in FIG. 5, to increase efficiency in accessing the data values for a spawning pattern, the spawning patterns are always aligned with (do not straddle) the RAM banks, i.e. each given subset of 4×2 or 2×4 data values is stored within a single RAM bank.

As is also shown in FIG. 5, the 3×3 kernel will, at some point in the overall convolution of the array of input data values, straddle the data values of two cache lines (see, e.g., 3×3 kernel 510 which straddles the two cache lines of 16×8 data values). However, as is shown in FIG. 5, to increase efficiency in accessing the data values for a spawning pattern, the spawning patterns are also always aligned with (do not straddle) the cache lines, i.e. a given subset of 4×2 or 2×4 data values is stored within a single cache line.

FIG. 5 also shows the relationship between a 5×5 kernel and the RAM banks, the cache lines and the spawning patterns. As is shown in FIG. 5, the 5×5 kernel requires six spawning patterns (see, e.g., 5×5 kernel 512). (However, as will be discussed in more detail below, this can be reduced from six spawning patterns to five spawning patterns by using a combination of four horizontally orientated subsets of 4×2 data values and one vertically orientated subset of 2×4 data values).

As is also shown in FIG. 5, the 5×5 kernel will, at some point in the overall convolution of the array of input data values, straddle the input data values of two RAM banks and two cache lines (see, e.g., 5×5 kernel 512). However, as is shown in FIG. 5, to increase efficiency in accessing the data values for a spawning pattern, the spawning patterns are again always aligned with (do not straddle) the RAM banks or cache lines, i.e. each given subset of 4×2 or 2×4 data values is stored within a single RAM bank and/or cache line.

Figure 6:
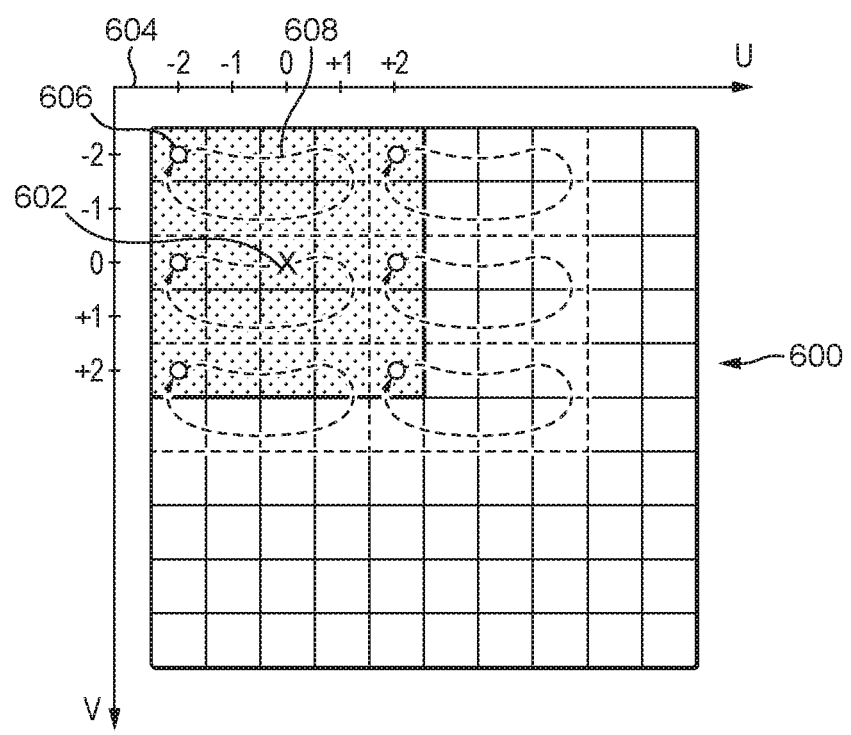
FIG. 6 shows the use of offsets from a convolution position when spawning input data value indices according to an embodiment of the technology described herein.

FIG. 6 shows the use of offsets from a convolution position when performing a spawning mechanism. The offsets can be positive or negative.

In FIG. 6, a 5×5 kernel is being applied to an array 600 of input data values. As is shown in FIG. 6 with "X", a single convolution position 602 at absolute position 2,2 can be provided for the centre of the kernel for the convolution operation. However, this convolution position may be given the relative position 0,0 according to offset axes 604.

A first spawning mechanism can then start at offset −2,−2 (shown with "0" 606) from the convolution position and proceed (as shown by the dashed path 608) to process a 4×2 subset of input data values of the array 600. Then, a second spawning mechanism can start at offset +2,−2 from the convolution position and proceed to process a 4×2 subset of input data values of the array 600. Then, a third spawning mechanism can start at offset −2,0 from the convolution position and proceed to process a 4×2 subset of input data values of the array 600. Then, a fourth spawning mechanism can start at offset +2,0 from the convolution position and proceed to process a 4×2 subset of input data values of the array 600. Then, a fifth spawning mechanism can start at offset −2,+2 from the convolution position and proceed to process a 4×2 subset of input data values of the array 600.

Finally, a sixth spawning mechanism can start at offset +2,+2 from the convolution position and proceed to process a 4×2 subset of input data values of the array 600.

The above process can then be repeated for a new convolution position, e.g. at absolute position 3,2, but with the new convolution position being given the relative position 0,0 according to offset axes. This allows the same set of offsets to be used to spawn convolution processing passes each time the kernel is applied for a convolution operation.

The process shown in FIG. 6 requires six cycles of spawning patterns to be used. As discussed above, this can be reduced to five cycles of spawning patterns by using a combination of four horizontally orientated 4×2 subsets of data values and one vertically orientated 2×4 subset of input data values. This is illustrated in FIG. 7.

Figure 7:
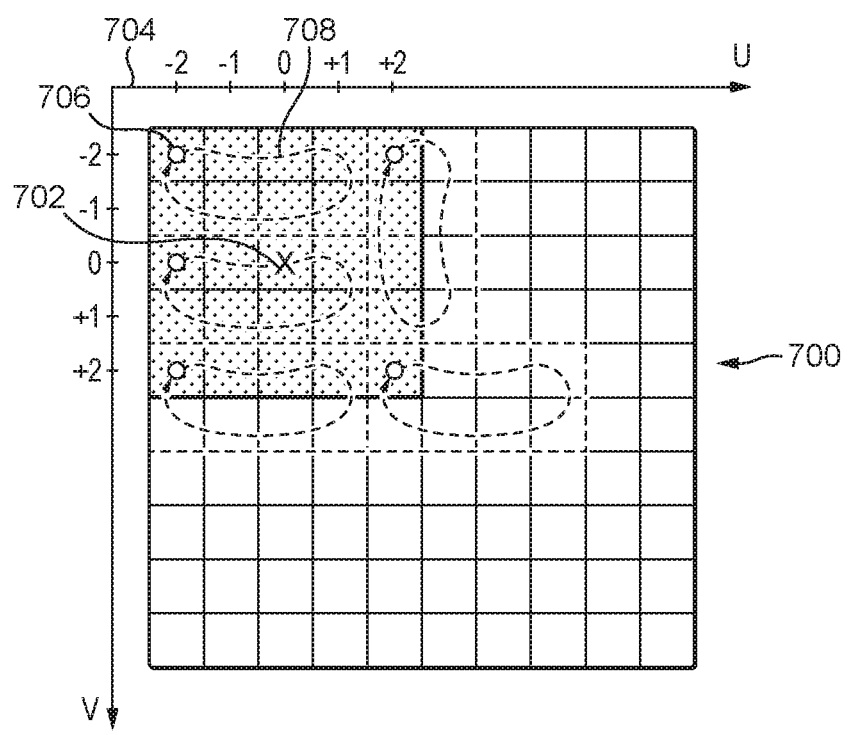
FIG. 7 shows the use of offsets from a convolution position when spawning input data value indices according to another embodiment of the technology described herein.

As with FIG. 6, FIG. 7 shows the use of offsets from a convolution position when performing a spawning mechanism. In FIG. 7, a 5×5 kernel is again being applied to an array 700 of input data values. As is shown in FIG. 7 with "X", a single convolution position 702 at absolute position 2,2 can again be provided for the centre of the kernel for the convolution operation. However, this convolution position may again be given the relative position 0,0 according to offset axes 704.

A first spawning mechanism can then start at offset −2,−2 (shown with "O" 706) from the convolution position and proceed (as shown by the dashed path 708) to process a 4×2 subset of input data values of the array 700. Then, a second spawning mechanism can start at offset +2,−2 from the convolution position and proceed to process a vertically orientated 2×4 (rather than horizontally orientated 4×2) subset of input data values of the array 700. Then, a third spawning mechanism can start at offset −2,0 from the convolution position and proceed to process a 4×2 subset of input data values of the array 700. Then, a fourth spawning mechanism can start at offset −2,+2 from the convolution position and proceed to process a 4×2 subset of input data values of the array 700. Finally, a fifth spawning mechanism can start at offset +2,+2 from the convolution position and proceed to process a 4×2 subset of input data values of the array 700.

The above process can again be repeated for a new convolution position, e.g. at absolute position 3,2, but with the new convolution position being given the relative position 0,0 according to offset axes. This again allows the same set of offsets to be used to spawn convolution processing passes each time the kernel is applied for a convolution operation.

It can be seen from the above that embodiments of the technology described herein can allow a graphics texture mapping unit to perform a variety of convolution operations in an efficient manner. This is achieved in embodiments of the technology described herein by providing a texture mapping apparatus that comprises texture fetching circuitry operable to receive a set of weight values for a convolution operation and fetch a set of input data values on which the convolution operation is to be performed from memory. The texture mapping apparatus further comprises texture filtering circuitry operable to perform a convolution operation using the set of received weight values and the set of fetched input data values.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics texture mapping apparatus, the method comprising the texture mapping apparatus:
receiving a set of weight values for a convolution operation to be performed and fetching from memory a set of input data values on which the convolution operation is to be performed; and
performing the convolution operation on the fetched set of input data values using the received set of weight values;
further comprising the texture mapping apparatus:
performing the convolution operation as plural convolution processing passes, wherein each convolution processing pass comprises the application of a subset of the set of weight values for the convolution operation to a corresponding subset of the set of input data values for the convolution operation; and
combining the results for the plural convolution processing passes to give an output array for the convolution operation being performed on the set of input values;
wherein each convolution processing pass further comprises calculating indices of the set of input data values at which to apply the subset of the set of weight values to generate the corresponding subset of the set of input data values by offsetting indices for a convolution position.

2. The method of claim 1, further comprising:
providing an instruction to perform the convolution operation to the texture mapping apparatus, the instruction indicating the set of weight values to be used in the convolution operation and the set of input data values on which the convolution operation is to be performed;
the texture mapping apparatus, in response to the instruction:
fetching from memory the indicated set of input data values on which the convolution operation is to be performed; and
performing the convolution operation on the fetched set of input data values using the indicated set of weight values.

3. The method of claim 1, wherein:
receiving the set of weight values for the convolution operation comprises the texture mapping apparatus fetching the set of weight values for the convolution operation from memory.

4. The method of claim 1, wherein:
the convolution operation is performed as part of an image post-processing operation or as part of an artificial neural network processing operation.

5. The method of claim 1, further comprising the texture mapping apparatus:
fetching from memory a set of texture data values with which a texture mapping operation is to be performed;
calculating a set of interpolation weight values for the texture mapping operation; and
performing a texture mapping operation using the set of calculated interpolation weight values and the set of fetched texture data values.

6. The method of claim 1, further comprising the texture mapping apparatus:
storing a subset of a set of input data values to be used when performing a convolution processing pass within a single addressable storage region of plural addressable storage regions of a local storage unit that is operable to store input data values locally to the texture mapping apparatus.

7. The method of claim 1, wherein:
the subsets of the set of input data values used when performing the plural convolution processing passes for the convolution operation comprise a combination of vertically and horizontally orientated subsets of input data values.

8. A graphics texture mapping apparatus, the texture mapping apparatus comprising:
texture fetching circuitry operable to receive a set of weight values for a convolution operation to be performed and to fetch from memory a set of input data values on which the convolution operation is to be performed; and
texture filtering circuitry operable to perform the convolution operation on the set of input data values fetched by the texture fetching circuitry using the set of weight values received by the texture fetching circuitry;
wherein the texture filtering circuitry is further operable to:
perform the convolution operation as plural convolution processing passes, wherein each convolution processing pass comprises the application of a subset of the set of weight values for the convolution operation to a corresponding subset of the set of input data values for the convolution operation; and
combine the results for the plural convolution processing passes to give an output array for the convolution operation being performed on the set of input values;
wherein each convolution processing pass further comprises calculating indices of the set of input data values at which to apply the subset of the set of weight values to generate the corresponding subset of the set of input data values by offsetting indices for a convolution position.

9. The apparatus of claim 8, wherein:
the texture mapping apparatus is operable to:
receive an instruction to perform the convolution operation, the instruction indicating the set of weight values to be used in the convolution operation and the set of input data values on which the convolution operation is to be performed;
and to, in response to the instruction:
fetch from memory the indicated set of input data values on which the convolution operation is to be performed; and
perform the convolution operation on the fetched set of input data values using the indicated set of weight values.

10. The apparatus of claim 8, wherein:
the texture mapping apparatus is operable to fetch the set of weight values for the convolution operation from memory.

11. The apparatus of claim 8, wherein:
the convolution operation is performed as part of an image post-processing operation or as part of an artificial neural network processing operation.

12. The apparatus of claim 8, wherein:
the texture fetching circuitry is operable to fetch from memory a set of texture data values with which a texture mapping operation is to be performed; and the texture filtering circuitry is operable to calculate a set of interpolation weight values for the texture mapping operation and perform a texture mapping operation using the set of calculated interpolation weight values and the set of fetched texture data values.

13. The apparatus of claim 8, wherein:
the texture fetching circuitry comprises a local storage unit operable to store input data values locally to the texture mapping apparatus, the local storage unit comprising plural addressable storage regions operable to store the input data values, the texture fetching circuitry being operable to store a subset of a set of input data values to be used when performing a convolution processing pass within a single addressable storage region of the plural addressable storage regions of the local storage unit.

14. The apparatus of claim 8, wherein:
the subsets of the set of input data values used when performing the plural convolution processing passes for the convolution operation comprise a combination of vertically and horizontally orientated subsets of input data values.

15. A graphics processing unit comprising:
a texture mapping apparatus; and
data processing circuitry operable to provide an instruction to perform a convolution operation to the texture mapping apparatus, the instruction indicating a set of weight values to be used in the convolution operation and a set of input data values on which the convolution operation is to be performed;
wherein the texture mapping apparatus comprises:
  texture fetching circuitry operable to fetch from memory the set of input data values on which the convolution operation is to be performed; and
  texture filtering circuitry operable to perform the convolution operation on the set of input data values fetched by the texture fetching circuitry using the set of weight values indicated in the convolution operation instruction received by the texture mapping apparatus;
wherein the texture filtering circuitry is further operable to:
  perform the convolution operation as plural convolution processing passes, wherein each convolution processing pass comprises the application of a subset of the set of weight values for the convolution operation to a corresponding subset of the set of input data values for the convolution operation; and
  combine the results for the plural convolution processing passes to give an output array for the convolution operation being performed on the set of input values;
  wherein each convolution processing pass further comprises calculating indices of the set of input data values at which to apply the subset of the set of weight values to generate the corresponding subset of the set of input data values by offsetting indices for a convolution position.

16. A non-transitory computer readable storage medium storing computer software code which when executing on a processor performs a method of operating a graphics texture mapping apparatus, the method comprising the texture mapping apparatus:
receiving a set of weight values for a convolution operation to be performed and fetching from memory a set of input data values on which the convolution operation is to be performed; and
performing the convolution operation on the fetched set of input data values using the received set of weight values;
further comprising the texture mapping apparatus:
performing the convolution operation as plural convolution processing passes, wherein each convolution processing pass comprises the application of a subset of the set of weight values for the convolution operation to a corresponding subset of the set of input data values for the convolution operation; and
combining the results for the plural convolution processing passes to give an output array for the convolution operation being performed on the set of input values;
wherein each convolution processing pass further comprises calculating indices of the set of input data values at which to apply the subset of the set of weight values to generate the corresponding subset of the set of input data values by offsetting indices for a convolution position.

* * * * *